United States Patent
Guntur et al.

(10) Patent No.: US 9,223,381 B2
(45) Date of Patent: Dec. 29, 2015

(54) METHOD AND APPARATUS TO SAVE POWER UPON RESUME IN MULTI-CORE SYSTEM

(71) Applicant: Samsung Electronics Co., Ltd., Gyeonggi-do (KR)

(72) Inventors: Ravi Sankar Guntur, Bangalore (IN); Nitish Ambastha, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 298 days.

(21) Appl. No.: 13/975,615

(22) Filed: Aug. 26, 2013

(65) Prior Publication Data

US 2014/0059372 A1    Feb. 27, 2014

(30) Foreign Application Priority Data

Aug. 24, 2012  (IN) .......................... 3504/CHE/2012

(51) Int. Cl.
*G06F 1/32* (2006.01)

(52) U.S. Cl.
CPC ............ *G06F 1/3234* (2013.01); *G06F 1/3287* (2013.01); *Y02B 60/1282* (2013.01)

(58) Field of Classification Search
CPC .............................. G06F 1/3234; G06F 1/3287
See application file for complete search history.

(56) References Cited

U.S. PATENT DOCUMENTS

| | | | |
|---|---|---|---|
| 5,812,860 A | 9/1998 | Horden et al. | |
| 7,155,617 B2 | 12/2006 | Gary et al. | |
| 7,840,825 B2 | 11/2010 | Altevogt et al. | |
| 2009/0089470 A1* | 4/2009 | Ven | 710/260 |
| 2011/0252251 A1* | 10/2011 | de Cesare et al. | 713/320 |
| 2012/0159224 A1* | 6/2012 | Bondalapati et al. | 713/324 |

FOREIGN PATENT DOCUMENTS

WO    2011/127128 A1    10/2011

OTHER PUBLICATIONS

W. Lloyd Bircher & Lizy K. John, Analysis of Dynamic Power Management on Multi-Core Processors, 2008, The University of Texas at Austin.

* cited by examiner

*Primary Examiner* — Kim Huynh
*Assistant Examiner* — Vincent Chang
(74) *Attorney, Agent, or Firm* — Cha & Reiter, LLC

(57) ABSTRACT

A method is provided for resuming one or more cores of a multi-core processor that is part of an electronic device, the method comprising: grouping wakeup sources into a plurality of computing domains; receiving an interrupt associated with a wakeup source; identifying a first computing domain from the plurality that the wakeup source is part of; mapping the first computing domain to a first indication of one or more states of a first core of the processor; configuring the first core to enter the one or more states that are indicated by the first indication; and resuming the first core after the first core is configured.

20 Claims, 5 Drawing Sheets

METHOD AND APPARATUS TO SAVE POWER UPON RESUME IN MULTI-CORE SYSTEM

CLAIM OF PRIORITY

This application claims priority under 35 U.S.C. §119(a) to a Indian Patent Application filed in the Indian Patent Office on Aug. 24, 2012 and assigned Serial No. 3504/CHE/2012, the contents of which is incorporated herein by reference.

FIELD

The present disclosure relates to power management in multi-core systems.

BACKGROUND

With the convergence of communication and entertainment applications, mobile device manufacturers are challenged to reduce power consumption while delivering better performance; in other words, do more for less. Power management is crucial in battery-powered systems because it helps conserve power when the systems are inactive.

When a system is not in use, it is put into a "sleep state" which is a low-power consuming state. In this "sleep state," the system is not performing any useful tasks for the user. As an example, power may be conserved by switching off a display when the system is inactive for some time.

Existing systems address the need for efficient power consumption by defining various processor states called C-states and P-states. C-states correspond to a processor either executing instructions or being in an idle state. P-states correspond to sets of pairs of voltage and frequency states. Operating systems deploy CPUIDLE and CPUFREQ subsystems to conserve power. Based on workload, CPUFREQ subsystems either lower or increase the voltage and frequency of each core present in a system. In some situations, CPUFREQ subsystems can choose to apply different C-states for each core present in a system, thus further reducing the system's power needs. Upon a wakeup by an interrupt, CPUFREQ subsystems may cause a system to transition into an appropriate C-state (C0) with its cores being put in high voltage and frequency states. Afterwards, based on current workload of the system, the subsystems may lower the voltage and frequency of the cores.

In battery powered handheld systems, often a majority of interrupts and their applications could be serviced in low voltage and frequency states to save power. In such systems, the above technique may cause a processor core to go to a higher P-state at first, and then come down to a lower P-state that is more appropriate for the current workload of the system. For example, on receiving wakeup events, a device may come out of a "sleep state", operating at a high performance point, irrespective of the demand that is placed on the device. Based on the demand, the device may later be put into an optimal performance point. However, the transition from the high performance point to the optimal performance point may be inefficient in some instances.

Similarly, on receiving wakeup events, secondary cores of the device may come out of a sleep state, after which the secondary cores may be put into an optimal performance point or sleep state based on the demand that is placed on the device. Similarly, this transition may also be inefficient at times. Accordingly, the need exists for new and more efficient power management techniques.

SUMMARY

The present disclosure addresses this need. In one aspect, a method is provided for resuming one or more cores of a multi-core processor that is part of an electronic device, the method comprising: grouping wakeup sources into a plurality of computing domains; receiving an interrupt associated with a wakeup source; identifying a first computing domain from the plurality that the wakeup source is part of; mapping the first computing domain to a first indication of one or more states of a first core of the processor; configuring the first core to enter the one or more states that are indicated by the first indication; and resuming the first core after the first core is configured.

In another aspect, an apparatus is provided comprising an integrated circuit further comprising at least one processor, the integrated circuit being configured to: group wakeup sources into a plurality of computing domains; receive an interrupt associated with a wakeup source; identify a first computing domain from the plurality that the wakeup source is part of; map the first computing domain to a first indication of one or more states of a first core of the processor; configure the first core to enter the one or more states that are indicated by the first indication; and resume the first core after the first core is configured.

BRIEF DESCRIPTION OF THE DRAWINGS

The examples provided herein will be better understood from the following description with reference to the drawings, in which.

DETAILED DESCRIPTION

Figure 1:
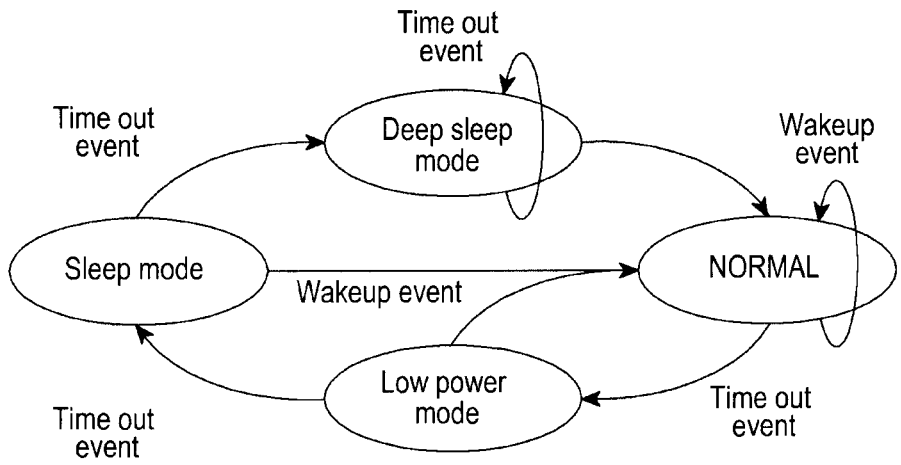
FIG. 1 is a state diagram showing different device power states and transitions, according to aspects of the disclosure.

The examples provided herein are explained more fully with reference to the drawings. Descriptions of well-known components and processing techniques are omitted so as to not unnecessarily obscure the examples herein. The examples should not be construed as limiting the scope of the disclosure in any way.

In some aspects, a method and system are provided that identify a wakeup event and use the different cores on a device and their operating state intelligently to save power. Wakeup events may be grouped into domains based on computing needs. Each computing domain may be next mapped to one or more of core IDs, P and C-states using a computing domain table and/or a default state table. When an interrupt is generated in the device, the computing domain and default state tables may be used to determine which cores are to be powered as well as the cores' particular voltage and frequency level.

Referring now to the drawings, and more particularly to FIGS. 1 through 6, where similar reference characters denote corresponding features consistently throughout the figures, there are shown some specific examples.

FIG. 1 is a state diagram of a battery powered device. The battery powered device may be a mobile phone, a Personal Digital Assistant (PDA), and/or any other suitable type of device. FIG. 1 shows various power states of the device. In this example, the device has several modes such as a normal mode, a low power mode, a sleep mode, and a deep sleep mode when not used. The device transitions to low the power mode on a timeout event. The device comes back to normal state on any wakeup event. In sleep mode, all the cores in the device are powered-off. In deep sleep mode, only RAM will be powered-on, but the CPU and other peripherals will be shut down. When a wakeup event occurs in sleep mode, the device moves to the normal mode. The number of different low power states that are available to the device depends upon the type of the device and on the type of low power options that the device's hardware can offer. For example, the device may be put into sleep mode when the device is not used and then brought back into normal mode when a key on the device is pressed.

Figure 2:
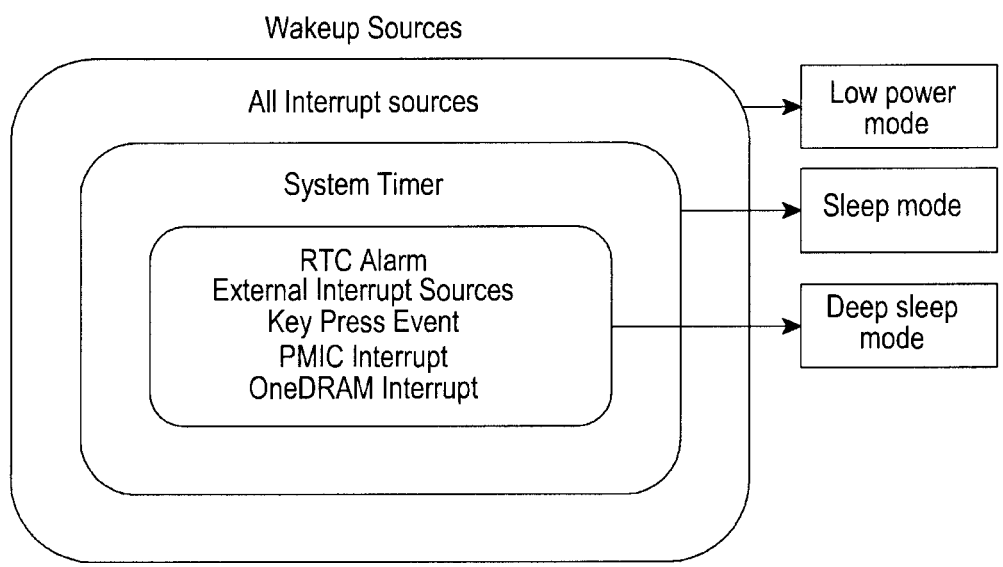
FIG. 2 is a diagram depicting various device sleep states and corresponding wakeup sources, according to according to aspects of the disclosure.

FIG. 2 depicts an example of device states and corresponding wakeup sources, according to aspects of the disclosure. Different wakeup sources are shown for each one of a plurality of low-power states. In particular, FIG. 2 shows that the wakeup sources for Deep Sleep Mode are a subset of the wakeup sources for Sleep Mode and the wakeup sources for Sleep Mode are a subset of the wakeup sources for Low Power Mode. For example, the wakeup sources when the device is in Deep Sleep mode are Real-time clock (RTC) alarm, external interrupt sources, key press event, Power Management Interrupt Controller (PMIC) which processes the interrupt request handler and finds from which source the interrupt is coming and modem interrupt such as an incoming call.

Figure 3:
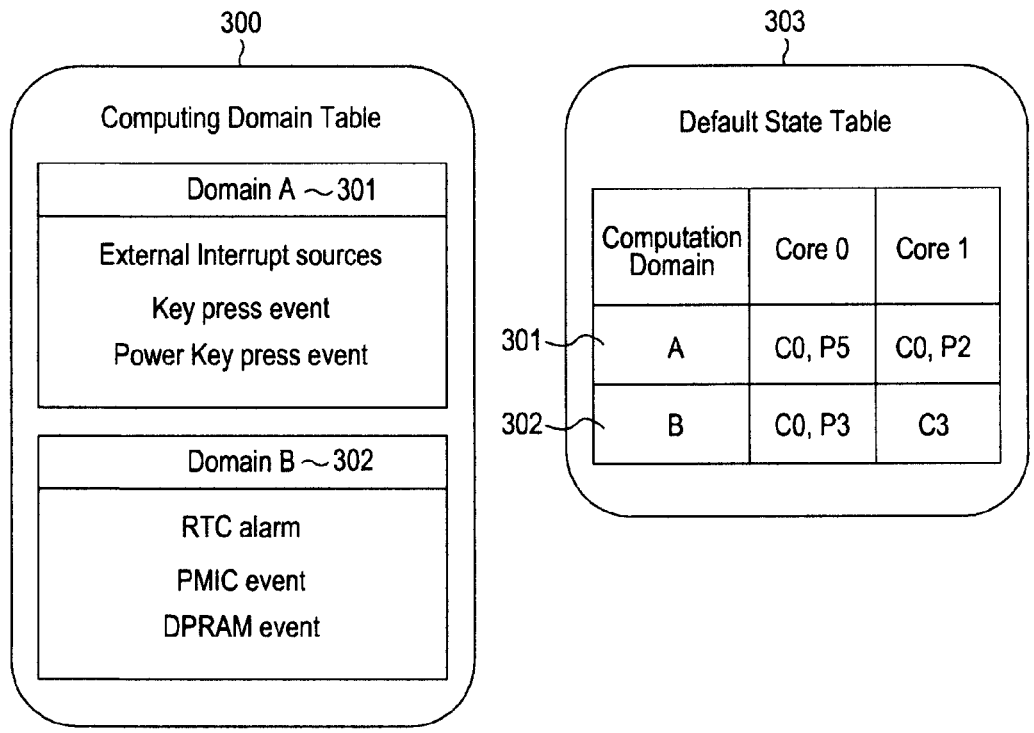
FIG. 3 is a diagram of a computational domain table and a default state table, according to aspects of the disclosure.

FIG. 3 depicts an example of a computational domain table and a default state table, according to aspects of the disclosure. The figure shows a computing domain table 300 which splits different wakeup events into separate domains as Domain A 301 and Domain B 302, respectively. In some implementations, the wakeup events may be grouped into different domains based on computational power requirements associated with the events. A default state table 303 may be configured that maps each domain that is defined in the domain table to core IDs and P-states associated with the cores. In some implementations, the Domain A 301 in the computing domain table 300 may group wake up events, such as external interrupt sources, key press event and power key press event. Domain B 302 may group wake up events, such as RTC alarm, PMIC event and DPRAM event.

In some implementations, according to the default state table 303, when any of the interrupts in the Domain A occurs, Core 0 of the device is put into the C0 operating state and the P5 processor performance state, while Core 1 of the device is put into the C0 operating state and the P2 processor state. In that regard, the technique described herein sets the C-states and P-states of CPUs when a particular wake up event has occurred based on the type of that event. In some instances, the P-states for the core 0 and core 1 may or may not differ from one another due to design limitations of some chipsets.

Processor performance states (P-states) and processor operating states (C-states) result from the capability of a processor to switch between different supported operating frequencies and voltages to modulate power consumption. The Advanced Configuration and Power Interface (ACPI) specification defines the CPU P-states power management states. The number of P-states is processor specific. If configured properly according to system workload, this feature provides power savings. Higher P-state numbers represent slower processor speeds. Power consumption is lower at higher P-states. For example, a P3 state is higher than a P1 state. A processor in P3 state will run more slowly and use less power than a processor running at P1 state. To operate at any P-state, the processor must be in the C0 operational state where the processor is working and not idling. These states are implementation-dependent, but P0 is always the highest-performance state, with P1 to Pn being successively lower performance states, up to an implementation-specific limit of n no greater than 16. P0 max power and frequency, P1 less than P0, voltage/frequency scaled, Pn less than P(n−1), voltage/frequency scaled. The ACPI specification also defines the CPU C-states power management states. CPU operating states (C-states) are the capability of an idle processor to turn off unused components to save power. When a processor runs in the C0 state it is working. A processor running in any other C-state is idle. Higher C-state numbers represent deeper CPU sleep states. At higher C-states, more components shut down to save power. Some components that are shut down include stopping the processor clock and stopping interrupts. The CPU power states C0-C3 are defined as C0 is the operating state, C1 (often known as Halt) is a state where the processor is not executing instructions, but can return to an executing state essentially instantaneously. All ACPI-conpornant processors must support this power state. Some processors, such as the Pentium 4, also support an Enhanced C1 state (C1E or Enhanced Halt State) for lower power consumption, C2 (often known as Stop-Clock) is a state where the processor maintains all software-visible state, but may take longer to wake up. This processor state is optional and C3 (often known as Sleep) is a state where the processor does not need to keep its cache coherent, but maintains other state. Some processors have variations on the C3 state (Deep Sleep, Deeper Sleep, etc.) that differ in how long it takes to wake the processor. This processor state is optional.

In some implementations, the device may be configured in such a way that in computational Domain A 301, the device has the highest Operating Performance Point (OPP) of CPU0 with all other cores being enabled. In computational Domain B 302, the device may have the lowest OPP of CPU0 with some of the other cores being disabled.

As noted, in some implementations, the device may be configured to wake up from sleep mode when the device receives certain wake up events. In some implementations, the wake up events may be generated by external interrupt sources, RTC alarm, key press event, PMIC event, DPRAM event and so on. For example, the device may be configured to wake up from sleep mode only when a RTC alarm event occurs.

Figure 4:
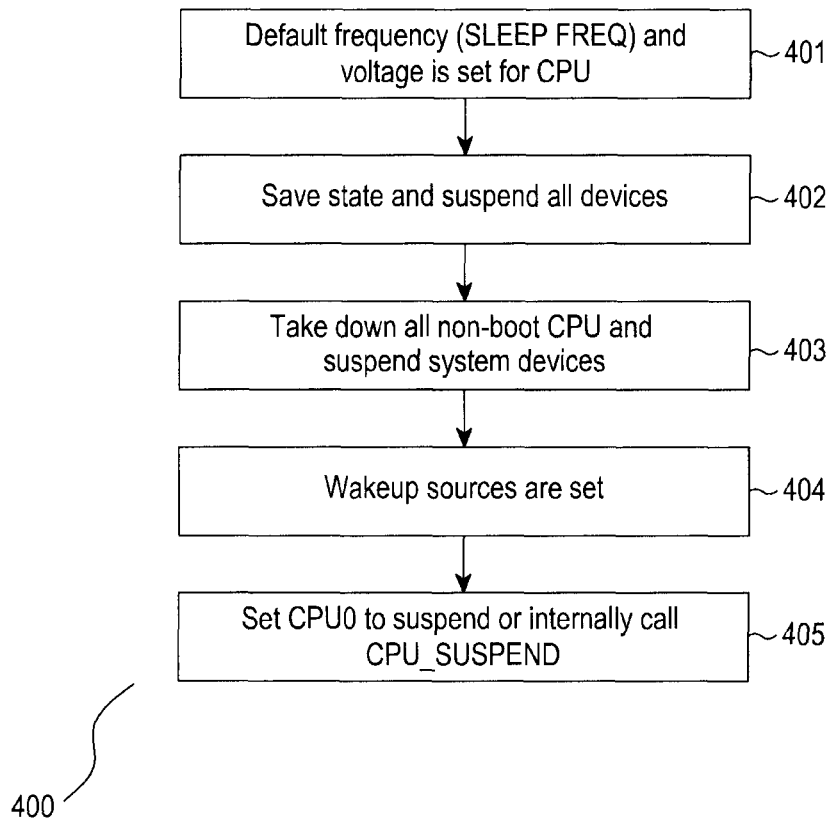
FIG. 4 is a flowchart of a process according to aspects of the disclosure.

FIG. 4 is a flowchart of a method 400 according to aspects of the disclosure. As illustrated, the method stores the CPU's current freq and the CPU is set to sleep frequency (SLEEP FREQ) as default frequency (401). Also the method sets the voltage for the CPU. Then, the method saves the states of one or more devices and those devices are suspended afterwards (402). Then, the method suspends Non-boot CPUs and system devices (403). Then, the method sets wakeup sources (404). Then, the method sets the master CPU to suspend or internally calls CPU_suspend (405). The various actions in method 400 may be performed in the order presented, in a different order, or simultaneously. Further, in some implementations, some actions listed in FIG. 4 may be omitted.

Figure 5:
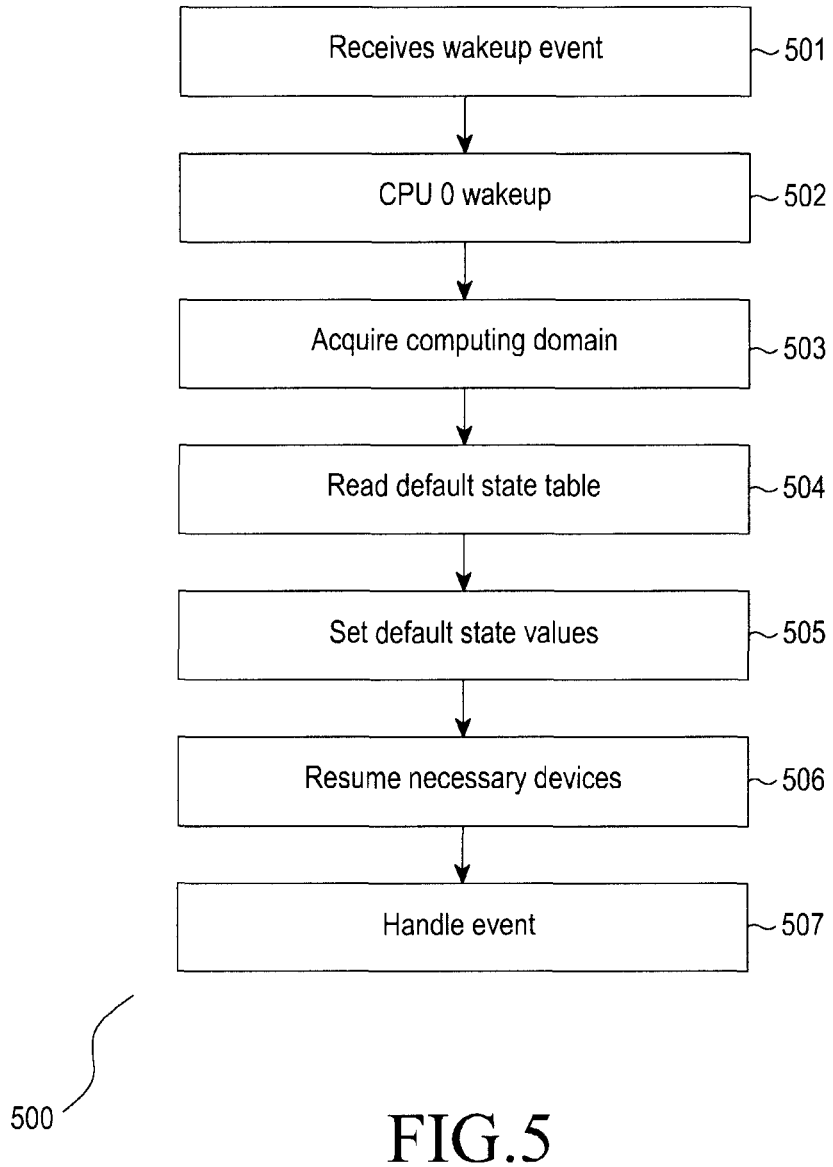
FIG. 5 is a flowchart of a process according to aspects of the disclosure.

FIG. 5 is a flowchart of a method 500 according to aspects of the disclosure. As illustrated, the method starts by receiving a new wakeup event (501). Then the method wakes up a master CPU (CPU 0-boot core) (502). The method then acquires a computing domain to which the event belongs (e.g., Domain A 301 or Domain B 302) by using the Computing Domain Table 300 (503). Further, the method identifies the default state for the acquired computing domain by Default State Table 303 (504). Then the method brings the cores of the processor identified in Default State Table 303 into the respective states for those cores that are identified in the Default State Table 303 (505). The method next resumes necessary cores for the event and other devices will remain in suspend state (506). Finally the method handles the event (507). The various actions in method 500 may be performed in the order presented, in a different order or simultaneously. Further, in some implementations, some actions listed in FIG. 5 may be omitted.

The additional power saved using the proposed method may be computed as follows:

$$\text{Energy} = Ni * Nc * Pc * T$$

where,

Ni=number of times selected interrupt occurs

Nc=number of cores available in device

Pc=power consumed by each core running at Sleep freq (performance) value

T=time taken by the governor to react to identify correct freq or number of online CPUs.

Figure 6:
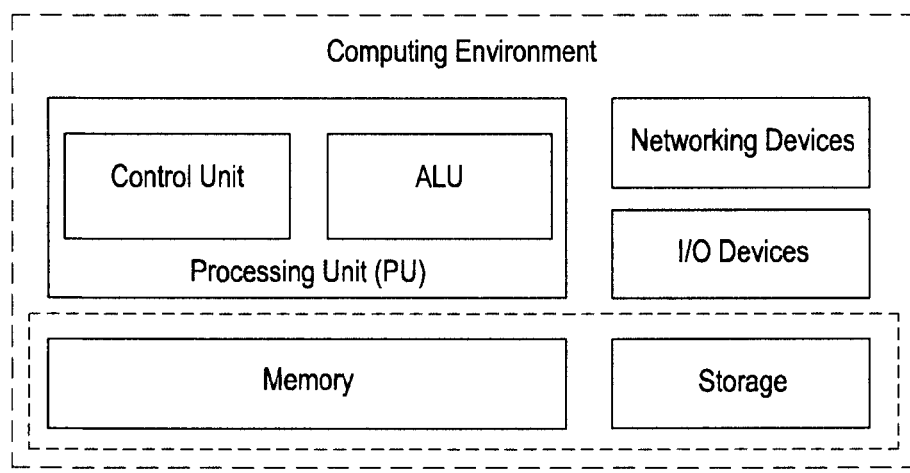
FIG. 6 is a schematic diagram of a computing environment according to aspects of the disclosure.

FIG. 6 illustrates computing environment implementing the techniques described herein according to aspects of the disclosure. As depicted the computing environment 600 comprises at least one processing unit that is equipped with a control unit 611 and an Arithmetic Logic Unit (ALU) 612, a memory 640, a storage unit 650, plurality of networking devices 620, and a plurality Input output (I/O) devices 630. The processing unit 610 is responsible for processing the instructions of the algorithm. The processing unit 610 receives commands from the control unit 611 in order to perform its processing. Further, any logical and arithmetic operations involved in the execution of the instructions are computed with the help of the ALU 612.

The overall computing environment 600 can be composed of multiple homogeneous and/or heterogeneous cores, multiple CPUs of different kinds, special media and other accelerators. The processing unit 610 is responsible for processing the instructions of the algorithm. The processing unit 610 receives commands from the control unit 611 in order to perform its processing. Further, any logical and arithmetic operations involved in the execution of the instructions are computed with the help of the ALU 612. Further, the plurality of process units may be located on a single chip or over multiple chips.

The algorithm comprising of instructions and codes required for the implementation are stored in either the memory unit 640 or the storage 650 or both. At the time of execution, the instructions may be fetched from the corresponding memory 640 and/or storage 650, and executed by the processing unit 610.

In case of any hardware implementations various networking devices 620 or external I/O devices 630 may be connected to the computing environment to support the implementation through the networking unit and the I/O device unit.

The implementations disclosed herein can be implemented through at least one software program running on at least one hardware device and performing network management functions to control the elements. The elements shown in FIG. 6 include blocks which can be at least one of a hardware device, or a combination of hardware device and software module.

The foregoing description of the specific examples will so fully reveal the general nature of the examples herein that others can, by applying current knowledge, readily modify and/or adapt for various applications such specific examples without departing from the generic concept. It is to be understood that the phraseology or terminology employed herein is for the purpose of description and not of limitation. Therefore, those skilled in the art will recognize that the examples herein can be practiced with modifications within the spirit and scope of the embodiments as described herein.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Although the above examples are provided with respect to battery-powered systems, the techniques describe herein may be applied to non-batter powered systems and/or any other suitable type of system.

The invention claimed is:

1. A method for resuming one or more cores of a multi-core processor that is part of an electronic device, the method comprising:

grouping wakeup sources into a plurality of computing domains;

receiving an interrupt associated with a wakeup source;

identifying a first computing domain from the plurality that the wakeup source is part of;

mapping the first computing domain to a first indication of one or more states of a first core of the processor;

configuring the first core to enter the one or more states that are indicated by the first indication; and resuming the first core after the first core is configured.

2. The method of claim 1, wherein the interrupt is received when the device is in at least one of: a sleep mode, a deep sleep mode, and a low power mode.

3. The method of claim 1, wherein the grouping comprises creating a computing domain table for the plurality of computing domains.

4. The method of claim 3, wherein the computing domain table comprises a mapping of interrupts in the wakeup sources to the plurality of computing domains.

5. The method of claim 3, wherein the first computing domain is identified based on the computing domain table.

6. The method of claim 1, further comprising creating a default state table that relates each one of the plurality of computing domains with a different set of one or more states of the first core.

7. The method of claim 6, wherein the mapping is performed based on the default state table.

8. The method of claim 6, wherein the default state table maps the first computing domain to different P-states for different cores of the processor.

9. The method of claim 6, wherein the default state table maps the first computing domain to a combination of a P-state and a C-state for the first core.

10. The method of claim 6, wherein:
the default state table maps the first computing domain to a first state of the first core; and
the default state table maps a second computing domain of the plurality to a second state of the first core that is characterized by a higher power consumption than the first state.

11. An apparatus, comprising:
an integrated circuit further comprising at least one processor, the integrated circuit being configured to:
group wakeup sources into a plurality of computing domains;
receive an interrupt associated with a wakeup source;
identify a first computing domain from the plurality that the wakeup source is part of;
map the first computing domain to a first indication of one or more states of a first core of the processor;
configure the first core to enter the one or more states that are indicated by the first indication; and
resume the first core after the first core is configured.

12. The apparatus of claim 11, wherein the interrupt is received when the apparatus is in at least one of: a sleep mode, a deep sleep mode, and a low power mode.

13. The apparatus of claim 11, wherein the grouping comprises creating a computing domain table for the plurality of computing domains.

14. The apparatus of claim 13, wherein the computing domain table comprises a mapping of interrupts in the wakeup sources to the plurality of computing domains.

15. The apparatus of claim 13, wherein the first computing domain is identified based on the computing domain table.

16. The apparatus of claim 11, wherein the integrated circuit is further configured to create a default state table that relates each one of the plurality of computing domains with a different set of one or more states of the first core.

17. The apparatus of claim 16, wherein the mapping is performed based on the default state table.

18. The apparatus of claim 16, wherein the default state table maps the first computing domain to different P-states for different cores of the processor.

19. The apparatus of claim 16, wherein the default state table maps the first computing domain to a combination of a P-state and a C-state for the first core.

20. The apparatus of claim 16, wherein:
the default state table maps the first computing domain to a first state of the first core; and
the default state table maps a second computing domain of the plurality to a second state of the first core that is characterized by a higher power consumption than the first state.

* * * * *